United States Patent [19]
Lesham et al.

[11] 3,971,575
[45] July 27, 1976

[54] RELEASABLE LOCKING DEVICE

[75] Inventors: Adam Lesham, Bloomfield; Glen Elwin Schukei, South Windsor, both of Conn.

[73] Assignee: Combustion Engineering, Inc., Windsor, Conn.

[22] Filed: Nov. 29, 1974

[21] Appl. No.: 528,121

[52] U.S. Cl. ................................. 285/85; 176/78; 403/320
[51] Int. Cl.² ......................................... F16L 15/00
[58] Field of Search .......... 403/320, 343; 151/19 R, 151/39, 40; 85/32 UN; 285/92, 84, 85; 176/78, 76

[56] References Cited
UNITED STATES PATENTS

| | | | |
|---|---|---|---|
| 903,435 | 11/1908 | Barrott | 403/320 |
| 1,859,045 | 5/1932 | Monckmeier | 85/32 UN |
| 2,728,895 | 12/1955 | Quackenbush et al. | 285/85 X |
| 3,368,602 | 2/1968 | Boyd | 151/13 |
| 3,770,583 | 11/1973 | Klumb | 176/76 |
| 3,864,211 | 2/1975 | King | 176/78 |

*Primary Examiner*—Andrew V. Kundrat
*Attorney, Agent, or Firm*—Stephen L. Borst

[57] ABSTRACT

A releasable locking device for urging limited relative rotation about a longitudinal axis between a first and second object threadably coupled together so as to maintain a tight connection of the coupled objects. The locking device comprises a brake plate which is supported with respect to the second object so as not to move rotationally relative thereto, a locking plate supported with respect to the first object so as not to move rotationally relative thereto, and a biasing means. The brake plate and locking plate are each positioned laterally adjacent to the first object and each have longitudinally extending complimentary ratchet teeth having inclined surfaces on their mutually facing, surfaces, the inclined surfaces of ratchet teeth of the brake plate being adapted to mate with the inclined surfaces of ratchet teeth of the locking plate. The biasing means normally biases the locking plate and brake plate toward one another to mate the inclined surfaces thereof so that the biasing force is transmitted through the inclined surfaces to urge relative rotation of the locking plate and brake plate. In this way, a force is continuously applied to maintain a tight connection of the two coupled objects. Also, the biasing means is releasable to permit one of the objects to be rotated freely relative to the other.

11 Claims, 7 Drawing Figures

3,971,575

1

RELEASABLE LOCKING DEVICE

BACKGROUND OF THE INVENTION

The present invention relates to a releasable locking device and more particularly to such a device for use in assembling end fittings to fuel assemblies for nuclear reactors.

Fuel assemblies forming the nuclear core of a nuclear reactor are generally comprised of a plurality of elongated fuel rods containing fuel or fissionable material which are grouped and joined together. Recently nuclear reactor fuel assemblies have been made wherein the structural support is provided by vertically extending hollow tubes which serve as guides for control rod elements and which are secured to upper and lower end plates. The fuel rods are aligned and supported within the structural framework formed by the guide tubes and end plates by spacer grids which are welded to the guide tubes and provide both lateral and, to some extent, axial restraint to the fuel rods.

Recently, it has been found desirable, from both the standpoint of neutron economy and dollar economy, to fabricate fuel assemblies using dissimilar metals. For example, U.S. Pat. No. 3,770,583 for a Fuel Assembly Hold Down Device in R. H. Klumb et al and copending application Ser. No. 373,207 for Fuel Assembly For A Nuclear Reactor by Anthony et al filed June 25, 1973 disclose a fuel assembly arrangement fabricated from the zirconium alloy Zircaloy for those components within the active core region and a material such as stainless steel or the nickel, chromium, iron alloy having the trade name Inconel for the remaining elements. Those components considered to be in the active core or fuel region include the vertically extending control rod guide tubes, spacer grids, the fuel rods and the cladding of the fuel rods themselves, while those components outside the active region include the upper and lower end plates or fittins and the means associated with the plates for supporting and maintaining the alignment of the fuel assembly within the reactor core.

Also it is known that it is desirable from the standpoint of cost and reactor efficiency, to have fuel assemblies in which defective fuel rods may be replaced or special fuel or burnable poison rods added after the assembly has been irradiated. Such versatility may preclude an entire assembly from being prematurely scrapped because of a relatively few defective fuel rods.

Copending U.S. patent application Ser. No. 373,207 filed June 25, 1973 and entitled "Fuel Assembly For A Nuclear Reactor" by A. J. Anthony et al, discloses an arrangement for a fuel assembly which incorporates both of the desirable features of being fabricated from two or more dissimilar materials and possessing the capability of being easily disassembled to provide access to the fuel rods for replacement thereof. As disclosed in that application, the upper and lower end fittings are attached to the fuel assembly so that they may be easily removed by means of threaded joints between the hollow structural members (i. e., guide tubes) and the means for alignment which extend from the end fittings for aligning and supporting the assembly within the reactor core.

It is to a locking device for these threaded joints to insure against retrograde movement of the alignment posts during normal reactor operation which the present invention is directed in one aspect thereof.

SUMMARY OF THE INVENTION

The present invention relates to a releasable locking device for urging limited relative rotation about a longitudinal axis between a first and second object threadably coupled together so as to maintain a tight connection of the coupled objects. The locking device comprises a brake plate which is supported with respect to the second object so as not to move rotationally relative thereto, a locking plate supported with respect to the first object so as not to move rotationally relative thereto, and a biasing means. The brake plate and locking plate are each positioned laterally adjacent to the first object and each have longitudinally extending complimentary ratchet teeth having inclined surfaces on their mutually facing, surfaces, the inclined surfaces of ratchet teeth of the brake plate being adapted to mate with the inclined surfaces of ratchet teeth of the locking plate. The biasing means normally biases the locking plate and brake plate toward one another to mate the inclined surfaces thereof so that the biasing force is transmitted through the inclined surfaces to urge relative rotation of the locking plate and brake plate. In this way, a force is continuously applied to maintain a tight connection of the two coupled objects. Also, the biasing means is releasable to permit one of the objects to be rotated freely relative to the other.

In a preferred embodiment, the locking device is designed to limit relative rotation between first and second longitudinally extending posts which are threadedly coupled together in end-to-end relationship. In a still further preferred embodiment the releasable locking device connects an end fitting to a nuclear fuel assembly support structure so as to effectively maintain the structural integrity of the fuel assembly during normal reactor operation but still permitting disassembly of the end fitting from the remainder of the nuclear fuel assembly.

DESCRIPTION OF THE PREFERRED EMBODIMENT

Figure 1:
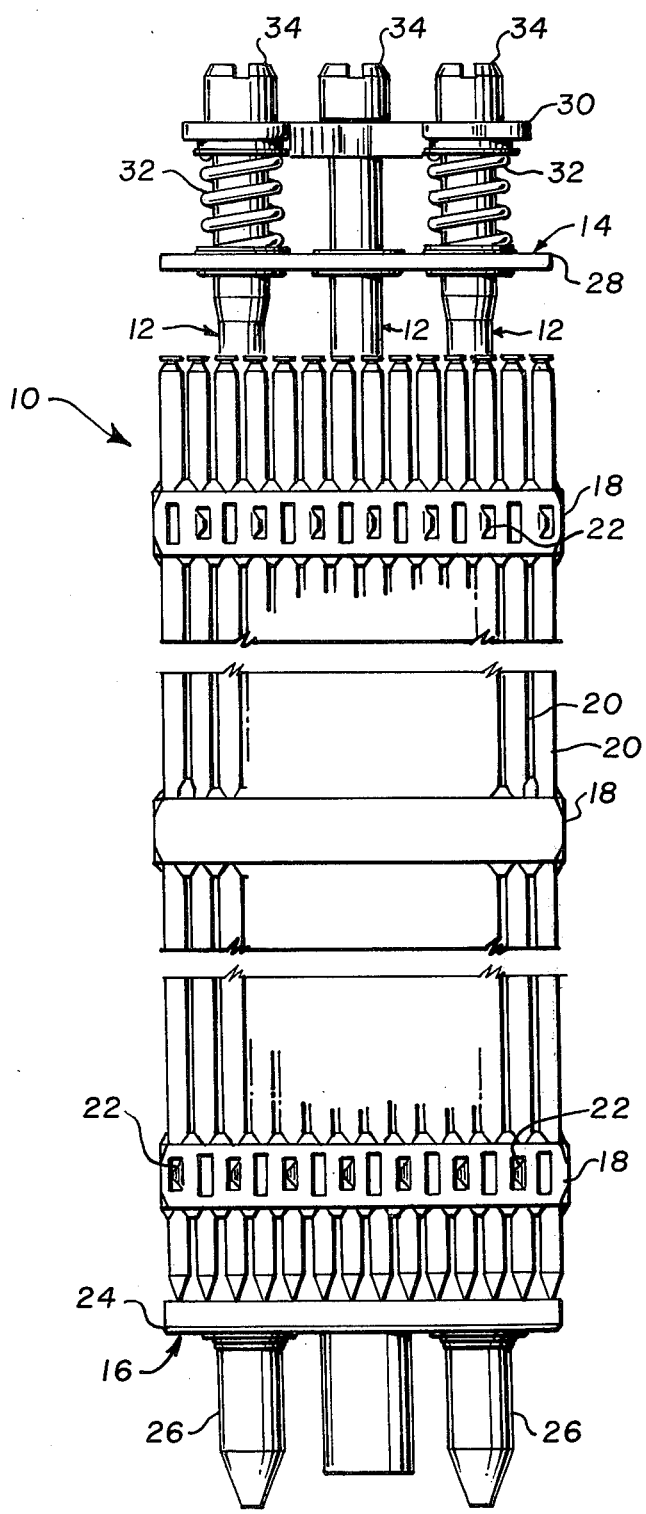
FIG. 1 is a fragmentary side view of a fuel assembly employing the present invention.
Figure 2:
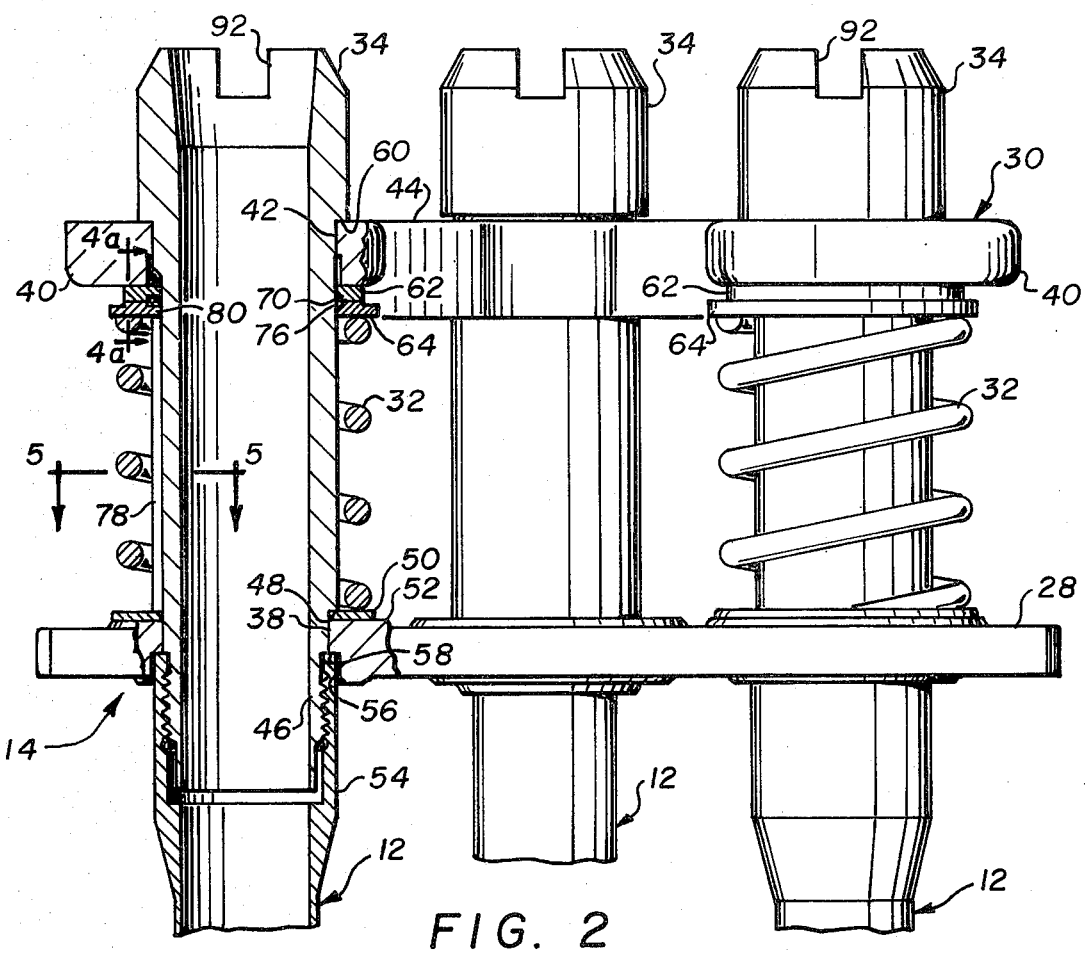
FIG. 2 is an enlarged side elevation, partly in section, of the upper end fitting connection of the fuel assembly of FIG. 1.

Referring to FIG. 1, there is shown a nuclear reactor fuel element assembly 10 which is adapted to be placed in the nuclear core of a reactor. The fuel assembly 10 is comprised of five vertically extending parallel Zircaloy guide tubes 12 co-extensive with one another and attached to upper and lower end fittings 14 and 16 respectively. Four of the guide tubes 12 are approximately located in the four corners of the fuel assembly 10 and a fifth guide tube 12 is centrally located (see FIG. 6). The guide tubes 12 and the end fittings 14, 16 provide the structural framework for the fuel assembly 10. A plurality of rectangular Zircaloy spacer grids 18 are positioned at various elevations along the guide tubes 12 and are suitably welded thereto. A plurality of elongated, thin-walled fuel rods 20, having a Zircaloy cladding, are supported in a parallel vertical arrangement within the fuel assembly 10 by the several spacer grids 18. The fuel rods 20 contain the nuclear fuel which by way of a sustained nuclear chain reaction, generates substantial amounts of heat for heating the coolant which flows up through and over the fuel assemblies of the nuclear core during reactor operation. The spacer grids 18 are of conventional design and include respective openings through which the fuel rods 20 extend. The grids 20 are provided with resilient means 22 projecting into the openings for supporting the fuel rods 20 against lateral displacement and also frictionally against longitudinal movement.

The zirconium alloy Zircaloy has been chosen as the material from which the guide tubes 12, the spacer grids 18, and the cladding of the fuel rods 20 are fabricated because of its relatively low neutron absorption cross section and its high corrosion resistance to water at the customary operating temperatures of pressurized water reactors. In the active fuel region of a nuclear core where these components are located it is desirable, as is well known, to maintain neutron absorption by materials other than the fuel at a minimum. However, the disadvantages of Zircaloy which include its high cost, poor wear resistance when subjected to relative motions or rubbing against adjacent components, and the necessity of welding performed in an inert atmosphere, make it undesirable for use in fabricating the components of fuel assemblies which are not located within the active core region. Accordingly, it has been found desirable to fabricate the end fittings 14 and 16 and other components of the fuel assembly 10 which lie outside the active region from another material such as stainless steel or the nickel, chromium, iron alloy having the trade name Inconel.

The lower end fitting 16 is comprised essentially of a lower end plate 24 having alignment posts 26 connected thereto and depending downwardly therefrom. The alignment posts 26 may be either fixedly secured, or removably attached to the end plate 24 such as in a manner similar to that described hereinbelow with reference to the upper end fitting 14 to permit removal of the lower end fitting 16 from the fuel assembly guide tubes 12. The alignment posts 26 are adapted to fit slidably into holes in a core support plate (not shown) and provide the necessary vertical support and lateral alignment of the lower end of the fuel assembly 10 in the nuclear reactor. Alternatively, the alignment posts 26 could be adapted to slidably fit over alignment pins affixed to the core support plate. The lower end plate 24 contains a plurality of various sized and shaped openings (not shown) to permit the free flow of coolant fluid therethrough during normal operation of the reactor to cool and remove the heat generated by the fuel.

The upper end fitting 14 in the preferred embodiment is of the holddown type similar to that disclosed in U.S. Pat. No. 3,770,583. This holddown type upper end fitting 14 essentially comprises an upper end plate 28 extending transversely of the vertically extending guide tubes 12, a holddown plate 30 extending transversely of the guide tubes 12 and being generally parallel to and spaced from the upper end plate 28, and coil spring means, such as coil springs 32, in compression and acting between the holddown plate 30 and the upper end plate 28. When placed in the core of the nuclear reactor, the holddown plate 30 is engaged by an upper fuel alignment plate (not shown) which acts to further compress the coil springs 32. The compressed springs 32 provide a downward force against the upper end plate 28, and thus the fuel assembly 10, to prevent lifting of the fuel assembly 10 upwardly off of the core support plate. As disclosed in U.S. Pat. No. 3,770,583 the size of the springs 32 is such that the fuel assembly 10 is loaded in a downward direction against the core support plate to a sufficient extent that the upward hydraulic forces directed against the fuel assembly 10 during reactor operation will not cause lifting of the fuel assembly 10 off of the core support plate.

Figure 6:
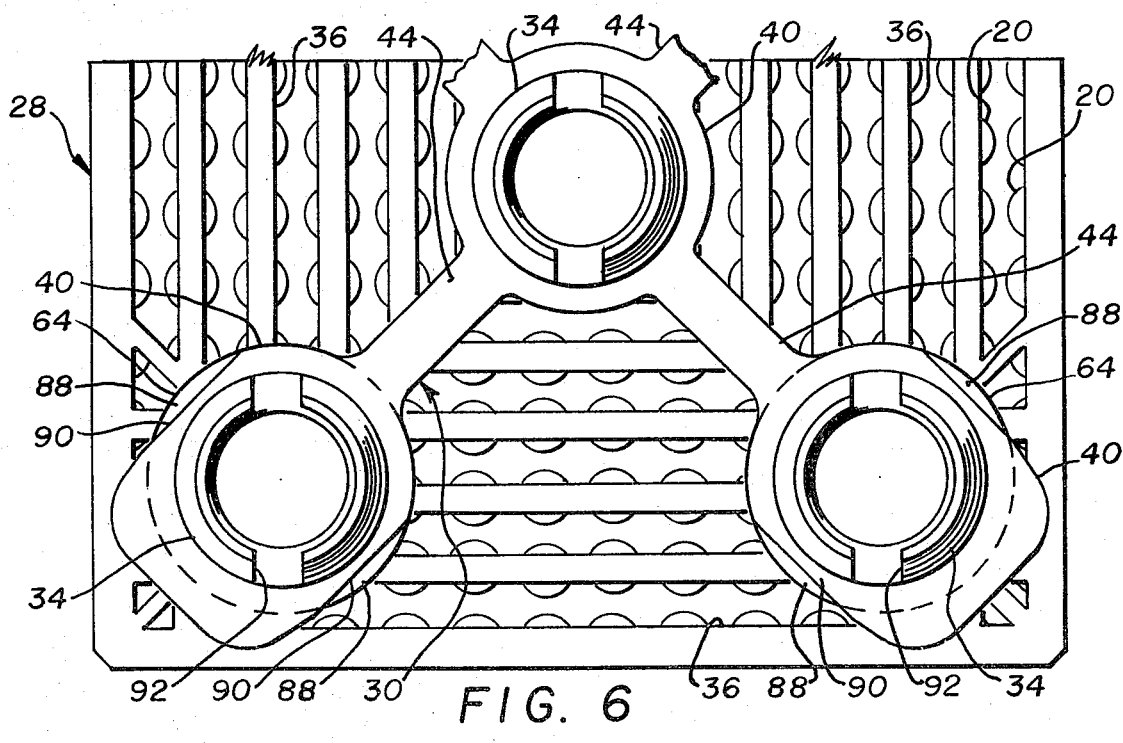
FIG. 6 is a partial plan view of the top of the fuel assembly shown in FIG. 1.

More fully described hereinbelow, the upper end fitting 14 is removably attached to the fuel assembly 10 by means of a plurality of alignment posts 34 which engage and pass through the holddown and upper end plates 28, 30 and which are threadably connected to the upper ends of the guide tubes 12. The alignment posts 34 extend above the holddown plate 30 and are adapted to be received within appropriate openings in the fuel alignment plate to align and laterally position the upper end of the fuel assembly 10 in the reactor core. Additionally, the alignment posts 34 also serve to locate and position the coil springs 32 which are concentrically positioned about the four corner posts 34 between the two plates 28, 30 of the upper end fitting 14. As with the lower end fitting plate 24, the upper end plate 28 in the preferred construction, has a plurality of various sized and shaped openings 36 therein to permit the free flow of coolant therethrough when installed in the reactor. The arrangement of these openings 36 is shown in FIG. 6. The upper end plate 28 also includes additional circular openings 38 which are in axial alignment with the five guide tubes 12 and through which the alignment posts 34 are adapted to extend downwardly. Also in the preferred embodiment, the holddown plate 30, partially shown in FIG. 6, is provided with hub portions 40 with apertures 42 extending vertically therethrough and sized to permit slidable passage therethrough of the alignment posts 34. The several hub portions 40 have legs 44 extending radially outward from them in a generally horizontal direction which serve to interconnect the hub portions 40 to makeup the holddown plate 30. The radially outermost portions of the hubs 40 extend sufficiently beyond the alignment posts 34 so that they will engage the lower surface of the fuel alignment plate beyond the openings therein into which the alignment posts 34 fit to align fuel assembly 10.

The attachment of the upper end fitting 14 to the fuel assembly 10 so as to permit removal therefrom is accomplished by means of threaded joints between the alignment posts 34 and the guide tubes 12 in a manner similar to that disclosed in copending application Ser. No. 373,207 filed June 25, 1973. At the lower ends, each of the four corner posts 34 includes a spindle 46 of reduced diameter projecting downwardly therefrom. The spindle 46 is sized to pass through one of the circular openings 38 in the upper end plate 28, and is provided with external threads on the lower portion thereof. The transition between the upper end of the alignment post 34 and the spindle 46 forms a downwardly facing shoulder 48 which engages the upper surface of a keyed washer 50 to limit the penetration of the spindle 46, the keyed washer 50 being for a purpose to be described hereinbelow and engaging the upper surface of a raised boss 52 formed on the end plate 28 about the opening 38. The upper end 54 of each of the guide tubes 12 is enlarged to a diameter which is sized to form a close fit with a bore section 56 of a larger diameter than the post opening 38 and being concentrically positioned with respect thereto in the lower surface of the end plate 28. The upper end 54 of the guide tube 12 is also provided with internal threads which are sized to mate with those provided on the spindle 46 so that when the members are assembled, the enlarged upper end 54 of the guide tube 12 is caused to bear against a shoulder 58 formed at the transition between the alignment post opening 38 and the enlarged bore section 56. Also the downwardly facing shoulder 48 of the upper alignment post 34 engages the keyed washer 50 which in turn exerts a downward force of the upper surface of the boss 52 to form a rigid mechanical connection between the alignment post 34, the upper end plate 28 and the guide tubes 12. Rotation of these various parts during operation of the reactor is prevented in a manner in accordance with the present invention to be described hereinbelow.

As only the four corner alignment posts 34 are needed for removably attaching the upper end fitting 14 to the fuel assembly 10, the central post 34 is integrally affixed to the upper end plate 28 such as by welding. A downwardly facing shoulder 60 on this central alignment post 34 then acts to maintain the integrity of the upper end fitting 14 by limiting or restricting upward movement of the holddown plate 30 relative to the upper end plate 28. Similar downwardly facing shoulders 60 are also provided on the corner posts 34 to maintain the holddown plate 30 generally level or horizontal when the upper end fitting 14 is attached to the fuel assembly 10. The central guide tube 12 is adapted to slidably fit within a bore of the central alignment post 34. In this way, free axial growth of the central guide tube 12 is permitted within the central alignment post 34.

As described in more detail in copending application Ser. No. 373,207, the above described mechanical threaded joint comprised of the guide tubes 12, the upper end plate 28 and the alignment posts 34 can be made from dissimilar materials having different coefficients of thermal expansion. In the preferred embodiment, the guide tubes 12 were made from Zircaloy, the upper end plate 28 from stainless steel and the alignment posts 34 from the nickel, chromium, iron alloy Inconel. The aforementioned copending application discloses a relationship and arrangement of the various components such that the mechanical joints will maintain their structural integrity when subjected to thermal cycling. In particular, the copending application discloses a relationship between thickness of the bore sections 38, 56 and the distance between the shoulder 48 and the load bearing threads on the alignment post 34 such that the assembled joint may be subjected to thermal cycling without incurring excessive stresses or deformation which would otherwise affect the strength and replacability requirements of the joint components. As the present invention is only directed to a locking device for preventing rotation or retrograde motion of the posts 34 with respect to the guide tubes 12 during normal reactor operation, it is not deemed necessary to further describe the sizing of the various components to prevent over stressing or deformation thereof. Such relationships are fully described in the copending application and reference may be made thereto if so desired.

The releasable locking device of the present invention which prevents relative retrograde motion of an alignment post 34 comprises a brake plate 62 and a locking plate 64 both of which have longitudinally extending complimentary ratchet teeth 66 and 68. A brake plate 62 and locking plate 64 are provided for each of the alignment posts 34 of the upper end fitting 14. The brake plate 62 and the locking plate 64 are each supported laterally adjacent to an alignment post 34 in such a manner that the complimentary ratchet teeth 66 and 68 of the two plates 62 and 64 are adapted to mate in engaging relationship with one another in normal operation of the reactor so as to prevent retrograde rotation of a post 34 relative to its guide tube 12, and also in such manner that the two plates 62 and 64 may be moved apart out of engaging relationship to freely permit the alignment post 34 to be unthreaded from the guide tube 12.

More particularly, each brake plate 62 comprises an annularly shaped plate which is supported on the underside of the holddown plate 30 and concentrically positioned with respect to a hub opening 42 through which an alignment post 34 extends. The circular opening 70 in the brake plate 62 is sized to allow free passage therethrough of the alignment post 34 and as such to permit free rotational movement of the post 34 relative to the brake plate 62. Each brake plate 62 has a plurality of radially extending grooves in the lower surface thereof which define a plurality of downwardly extending ratchet teeth 66 each of which has an inclined surface 72 and a vertical surface 74. The brake plate 62 may be affixed to the holddown plate 30 such as by welding. Alternatively the grooves defining the ratchet teeth 66 could be machined on a boss extending downwardly from the holddown plate 30, thereby eliminating the need for welding and concentrically positioning the plurality of individual brake plates 62 on the holddown brake plate 30.

Figure 3:
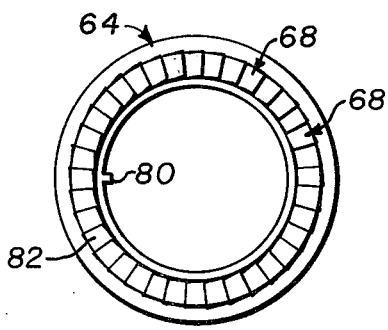
FIG. 3 is an enlarged plan view of the locking plate of the present invention.
Figure 4A:
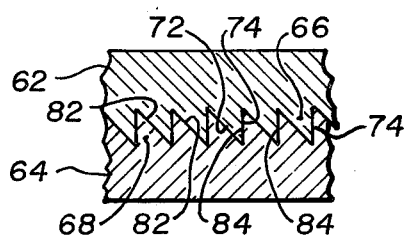
FIG. 4a is an enlarged side elevation view taken aong lines 4a—4a of FIG. 2 showing the brake plate and the locking plate in full mating engagement.

The locking plates 64 also each comprise an annularly shaped washer or plate whose central opening 76 is sized so as to permit the alignment post 34 to slide longitudinally therethrough. Each alignment post 34 is provided with a slot way 78 along the longitudinal surface thereof, which slot way 78 is operative to receive a radially inwardly extending tab 80 on the locking plates 64. The tab 80 effectively prevents rotation of the locking plate 64 relative to the alignment post 34 but permits free longitudinal movement thereof. In this manner the locking plate is associated with the alignment post 34 for preventing relative rotational movement therebetween. The locking plates 64 each have a plurality of radially extending grooves in the upper surface thereof, these grooves being similar to those of the brake plate 62, to define a plurality of ratchet teeth 68 and having an inclined surface 82 and a vertical surface 84. The teeth 66 and 68 on each of the mutually facing surfaces of the brake plate 62 and the locking plate 64 are so defined that they will mate with one another when engaged as shown in FIG. 4a; that is the inclined and vertical surfaces 72 and 74 of the brake plate 62 will mate and engage respectively the inclined and vertical surfaces 82, 84 of the locking plate 64.

The releasable locking device of the present invention further includes a biasing means which acts to bias the brake plates 62 and the locking plates 64 together in mating engagement during normal operation of the reactor. In the preferred embodiment, this biasing means comprises the helical coil springs 32 which are located and positioned about the several alignment posts 34 between the holddown plate 30 and the upper end plae 28, and which also serve as the holddown springs of the upper end fitting 14. The coil springs 32 are each captured between a keyed washer 50 and the lower surface of a locking plate 64. The keyed washers 50 include radial inwardly extending tabs 86 similar to those of the locking plates 64 which fit into the longitudinal slot way 78 of the alignment posts 34. Accordingly, the keyed washer 50, the locking plate 64 and the coil spring 32 will rotate as a unit with the fuel alignment post 34 when it is threaded into connecting relationship with the guide tube 12 or when it is disconnected in a manner described hereinbelow, thereby preventing binding or twisting of the springs 32 as alignment posts 34 are rotated. On the other hand, the brake plates 62 are fixed against relative rotation with respect to the upper end fitting 14 and the fuel assembly 10 by virtue of the fact that they are affixed to the holddown plate 30 and by virtue of the several alignment posts 34 passing longitudinally through both the holddown plate 30 and the upper end plate 28. In this manner a first means is provided to prevent relative rotational movement between the brake plate 62 and the upper end fitting 14 or the guide tube 12. Accordingly the brake plate 62 is associated with the guide tube 12 by means of elements 30, 34, 40 and 44 for preventing relative rotational movement therebetween.

It is to be noted that the surfaces of ratchet teeth 66, 68 on the mutually facing surfaces of the brake plate 62 and the locking plate 64 are so arranged that the contact will be on the inclined surface 72 of the brake plate 62 against the inclined surface 82 of the locking plate 64. In particular (see FIGS. 4a and 4b) when the locking plate 64 is urged against the brake plate 62 by the coil spring 32, the mated inclined surfaces will tend to cause the locking plate 64 to turn in a clockwise direction. The locking plate 64 will in turn transmit this tendency for clockwise rotation through tab 80 extending into slot 78 of alignment post 34 and thus attempt to cause the alignment post 34 to rotate in a clockwise direction to tighten the threaded connection between the spindle 46 of alignment post 34 and the enlarged upper end 54 of guide tube 12. The vertical surface 74 of brake plate 62 and the mating vertical surface 84 of locking plate 64 preclude the possibility of loading the mating parts on a surface which will tend to cause counterclockwise rotation or to loosen the locking plate 64.

Also it is to be noted that the inclined surfaces 72 and 82 of the ratchet teeth 66, 68 are so arranged and designed that relative retrograde rotation is prevented. As is well known to those familiar with the laws of inclined planes and the action of threaded fasteners, the angle of incline can be chosen to insure that the locking plate 64 will not rotate in a counterclockwise fashion relative to the brake plate 62. This involves consideration of the coefficient of friction along the inclined surfaces 72, 82 and of the biasing force applied by the coil spring 32. Specifically for the arrangement disclosed in the figures, the angle between the inclined surface 72 or 82 and the vertical surface 74 or 84 at the tip of a ratchet tooth 66 or 68 has been chosen as 30° and the force applied by the coil spring 32 is of the order of 100 lbs. or more. However, this is not meant to be limiting in any way as the present invention is equally applicable for arrangements having other angles of incline and/or other size forces. The selection of such arrangements can be easily determined by those skilled in the art depending on the specific characteristics desired.

Accordingly, from this it can be seen by those familiar with the laws of inclined planes and action of threaded fasteners that due to the unique assembly features and by careful selection of the angle of the incline of surfaces 72 and 82 that the joint assembly herein described will be constantly urged in a tightening direction and will not become loose even under extreme conditions of vibration, temperature cycling or a combination of vibration and temperature cycling.

Figure 4B:
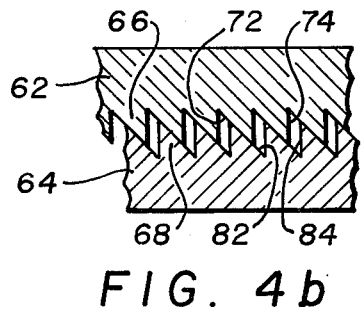
FIG. 4b is a view similar to that shown in FIG. 4a but showing the locking plate and the brake plate in partial mating engagement.
Figure 5:
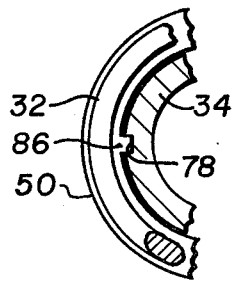
FIG. 5 is an enlarged sectional view taken along lines 5—5 of FIG. 2.

When the alignment posts 34 have been fully threaded into the guide tubes 12, it is unlikely that the brake plate 62 and the locking plate 64 will be fully mated together such as indicated in FIG. 4a. Rather it is more likely that the longitudinal arrangement of the locking plate 64 and the brake plate 62 will be similar to that shown in FIG. 4b wherein the two plates 62, 64 are longitudinally spaced a small distance apart. With such an arrangement, the locking plates 64, and accordingly the alignment posts 34, may be limitedly rotated in a clockwise manner relative to the guide tubes 12. However, any such movement will result in the brake plate 62 and locking plate 64 moving into full mating engagement and thereby prevent further tightening rotation which might otherwise cause excessive loading of the alignment post 34 being threaded into the guide tube 12. On the other hand, counterclockwise rotation is prevented as a result of an adequate angle of incline being selected and a sufficient biasing force being applied as described hereinabove. It should be noted that the natural tendency of the arrangement shown in FIG. 4b is for the brake plate 62 and the locking plate 64 to move toward full mating engagement, such as shown in FIG. 4a.

As is apparent, to thread or permit retrograde rotation of the alignment posts 34 with their respective guide tubes 12, it is necessary that the brake plate 62 and the locking plate 64 be disengaged from one another. In the preferred embodiment, this is accomplished with a special tool (not shown) having laterally spaced legs which are adapted to engage exposed portions 88 on the upper surface on the locking plate 64. As best seen in FIG. 6, each of the hubs 40 of the holddown plate 30 is narrowed on its side edge such at 90. This exposes two diametrically opposite sectors 88 of the locking plate 64 so that the tool may extend downwardly from above the fuel assembly 10 and over an alignment post 34 to engage and depress the locking plate 64. The holddown plate 30 remains elevated to bear against the downwardly facing shoulder 60 on the alignment post 34 as a result of the springs 32 for the remaining alignment posts 34 not having been further compressed. With one locking plate 64 for one post 34 depressed, a second tool (again not shown) may be inserted in the alignment post 34, engage the diametrically opposed notches 92 at the upper end of the posts 34, and rotate it out of engagement with its guide tube 12. As the post 34 is rotated, the locking plate 64 will slip against the tool depressing it and thus be rotated with the alignment post 34. When the alignment post 34 is uncoupled, the tools may be removed to again permit engagement of the brake plate 62 and locking plate 64, and the remaining posts 34 then be similarly uncoupled from their respective guide tubes 12. The entire upper end fitting 14 (i.e., the alignment posts 34, the holddown plate 30 and the upper end plate 28) can then be removed from the fuel assembly 10 to permit replacement of defective fuel rods and/or substitution of special fuel or burnable poison rods. It is noted that the upper end fitting 14 remains a unitary structure due to the central alignment post 34 being welded to the upper end plate 28 and limiting upward movement of the holddown plate 30 under the influence of the springs 32. Assembly or reassembly of the upper end fitting 14 to the fuel assembly 10 is simply accomplished by a reverse process with the locking plate 64 being depressed as for removal by the appropriate tool.

It is further to be noted that the two intended functions of the coil springs 32 (i.e., biasing the locking plate 64 upwardly against the brake plate 62 and exerting a force on the fuel assembly 10 downwardly against the core support plate) are compatable with one another. When the fuel assembly 10 is positioned in the reactor and the fuel alignment plate is in place, the holddown plate 30 will be moved downwardly relative to the alignment posts 34. Due to the free longitudinal movement of the holddown 30, the brake plate 62 and the locking plate 64 which is permitted relative to the alignment post 34, the downward movement of the holddown plate 30 will cause the engaged brake plate 62 and the locking plate 64 to compress the spring 32. This results in a downward force being exerted on the fuel assembly 10 through the upper end plate 28 and guide tubes 12 and an upward force on the locking plate 64 to maintain engagement with the brake plate 62 fixed to the underside of the holddown plate 30. Furthermore, the fact that the springs 32 remain compressed during reactor operation to exert a holddown force on the fuel assembly 10 insures that a biasing force will be applied to a locking plate 64 also during reactor operation to lock the alignment post 34 to the guide tubes 12 and continually urge the post 34 in a tightening direction.

Accordingly, there is disclosed herein a novel releasable locking device which is especially adapted for releasably attaching alignment posts 34 to guide tubes 12 of nuclear reactor fuel assembly 10. Although the invention has been described with reference to such a fuel assembly, it should be apparent that this is not the only application to which the present invention is suited. Instead it is equally applicable and may be used in any application where two objects are threadably coupled together and it is desired to only permit selected disengagement thereof while otherwise maintaining the two objects locked together. Such uses of the present invention are made possible with the use of a brake plate 62, a locking plate 64 and biasing means 32 which are arranged according to the present invention. The brake plate 62 is fixedly supported so as not to be able to move rotationally with respect to one of the objects and the locking plate 64 is fixedly supported so as not to move rotationally with respect to the other object. Both the brake plate 62 and the locking plate 64 are positioned laterally adjacent to one of the two objects and are adapted to engage one another. Ratchet teeth 66, 68 are provided on the mutually facing surfaces of the two plates 62, 64 and are arranged so that when the two plates 62, 64 are engaged, retrograde rotation of one object with respect to the other object is prevented by inclined surfaces 72, 82 which also act to continuously urge the parts into a tightening condition. The biasing means 32 normally biases the two plates 62, 64 together in mating engagement, but is releasable to permit coupling and uncoupling of the two objects.

It is of course to be noted that the present invention is equally applicable wherein the brake plate 62 and locking plate 64 are not annular washers which are concentrically positioned about posts. Instead, each of the plates 62, 64 could be of different shapes so long as the ratchet teeth 66, 68 of each are adapted for mating engagement with one another and are so arranged as to prevent relative rotation in one direction between the two objects which are normally to be locked together.

Also the present invention is not limited, with respect to nuclear reactors, to attaching upper end fittings 14 to fuel assemblies, but again is equally applicable for use in attaching lower end fittings 16 to fuel assemblies, or for use with other components of nuclear reactors.

While this preferred embodiment of the invention has been shown and described, it will be understood that it is merely illustrative and that changes may be made without departing from the scope of the invention. What is sought to be protected is only that which is set forth in the appended claims.

What is claimed is:

1. A releasable locking device for urging limited relative rotation about a longitudinal axis between a first and a second object threadedly coupled together so as to maintain a tight connection of the coupled objects, the locking device comprising:
   a brake plate having a plurality of ratchet teeth having inclined surfaces extending therefrom in the longitudinal direction, said brake plate being positioned laterally adjacent to a longitudinal portion of the first object;
   first means associated with said brake plate and said second object for preventing relative rotational movement therebetween;
   a locking plate having a plurality of ratchet teeth having inclined surfaces extending therefrom in the longitudinal direction and being complimentary with said ratchet teeth of said brake plate, said locking plate being positioned laterally adjacent to said first object so as to permit said inclined surfaces of said ratchet teeth of said locking plate and said brake plate to mate with each other;
   second means associated with said locking plate and said first object for preventing relative rotational movement therebetween;
   at least one of said brake plate and said locking plates being longitudinally movable relative to said first object to move said ratchet teeth into and out of mating engagement; and
   means for normally biasing said locking plate and said brake plate toward one another to mate said inclined surfaces thereof, the biasing force applied by said biasing means being transmitted through said inclined surfaces to urge relative rotation of said locking plate and said brake plate to apply a tightening force between said first and second objects, said biasing means being releasable to permit one of said objects to be freely rotated relative to the other of said objects and positioned to bear against said second object and said at least one longitudinally movable plate.

2. The locking device of claim 1 wherein said first and second objects are first and second longitudinally extending posts and wherein both said brake plate and said locking plate comprise annularly shaped washers which are concentrically positioned about said second post, each of said annularly shaped washers being longitudinally movable with respect to said second post; wherein said coil spring is concentrically positioned about said second post and bears against one of said annularly shaped washers; and wherein means are provided on said second post remote from said coil spring for preventing longitudinal movement of the other of said annularly shaped washers in a longitudinal direction away from said coil spring.

3. The locking device of claim 2 wherein said second means for supporting said locking plate washer comprises a longitudinally extending slot in the side wall of said second post and a laterally extending tab on said locking plate washer which is adapted to fit into said longitudinally extending slot on said second post.

4. The locking device of claim 3 wherein said one annularly shaped washer against which said coil spring bears is said locking plate washer; and wherein there is provided a third annularly shaped washer having a laterally extending tab adapted to fit into said longitudinal slot of said second post, said third annularly shaped washer being positioned concentrically about said second post and also being positioned at the end of said coil spring remote from said locking plate washer so that said coil spring will bear against said third washer, said third washer being adapted to transmit the load applied by said coil spring on said first longitudinally extending post.

5. A device for removably connecting an end fitting to a nuclear fuel assembly support structure, the support structure comprising at least one longitudinally extending post and the end fitting comprising a laterally extending plate, said post being fixed in the assembly support structure to prevent rotation about the post's axis relative to the assembly support structure, the device comprising:
- a longitudinally extending connecting post threadably connected to one end of said support structure post;
- means associated with said connecting post for connecting the laterally extending plate to and positioning it relative to the longitudinally extending support structure post;
- a first washer concentrically positioned about said connecting post and having a plurality of ratchet teeth having inclined surfaces extending longitudinally therefrom in a first longitudinal direction;
- means connecting the support structure and the first washer for supporting said first washer independently of said connecting post and for preventing relative rotation between said first washer and said support structure post;
- a second washer concentrically positioned about said connecting post and having a plurality of ratchet teeth having inclined surfaces complimentary with said inclined surfaces of said ratchet teeth of said first washer extending longitudinally therefrom in the longitudinal direction opposite from said first direction, said second washer being longitudinally positioned with respect to said first washer so as to permit said inclined surfaces of said ratchet teeth of said first washer and said second washer to mate with one another;
- means associated with said connecting post for supporting said second washer to prevent relative rotational movement between said second washer and said connecting post;
- at least one of said first washer and said second washer being longitudinally movably relative to said connecting post to move said ratchet teeth of said first and second washers into and out of mating engagement,
- means for normally biasing said first washer and said second washer toward one another to mate said inclined surfaces thereof, said inclined surfaces when mated acting to transmit the biasing force of said biasing means to urge relative rotation of said first and second washer in one direction and prevent relative rotation in the other direction to tighten the threaded connection of said connecting post to said support structure post and to prevent retrograde rotation of said connecting post, said biasing means being releasable to permit said washers to be moved out of mating engagement and thereby permit free rotational movement of said connecting post.

6. The device of claim 5 wherein said biasing means comprises a coil spring concentrically positioned about said connecting posts, said coil spring being in compression and positioned to bear against said at least one movable washer to bias said movable washer in the direction of the other of said washers, and further including means associated with said other washer for limiting longitudinal movement of said other washer in a direction away from said at least one movable washer.

7. The device of claim 6 wherein said means for connecting said laterally extending plate to said support structure post comprises enlarged laterally extending portions on said support structure post and said connecting post which capture said laterally extending plate therebetween when said connecting post is threadably connected to said support structure post, and wherein said coil spring is longitudinally positioned between said laterally extending plate and said at least one movable washer to bias said at least one movable washer away from said laterally extending plate.

8. The device of claim 7 wherein said at least one movable washer is said second washer and said other washer is said first washer; wherein said means for supporting said second washer comprises a longitudinally extending slot in the side wall of said connecting post and a laterally extending tab on said second washer which is adapted to fit into said longitudinally extending slot in said connecting post; and wherein there is a third washer having a laterally extending tab adapted to fit into said longitudinally extending slot in said connecting post and which is positioned between said coil spring and said laterally extending plate so that said coil spring, said second washer, and said third washer will rotate as a unit with said connecting post when said connecting post is rotated.

9. The device of claim 8 in which the support structure includes a plurality of other longitudinally extending posts laterally spaced from and interconnected to said one support structure post; and wherein said means for supporting said first washer comprises means extending laterally from said first washer and operatively connected to said other support structure posts to prevent relative lateral movement between said first washer and said other support structure posts.

10. The device of claim 9 wherein said means laterally extending from said first washer comprises a second laterally extending plate longitudinally spaced from said laterally extending plate of said upper end fitting; wherein said second laterally extending plate has longitudinal openings therein; and wherein there are a plurality of other connecting posts passing through said openings in said second laterally extending plate and engaging said other support structure posts.

11. The device of claim 10 wherein said means for limiting longitudinal movement of said first washer comprises an enlarged shoulder on said one connecting post engagable with said second laterally extending plate, said shoulder being longitudinally positioned on said one connecting post remote from both of said laterally extending plates whereby said three washers and said coil spring are longitudinally positioned between said two laterally extending plates.

* * * * *